(12) United States Patent
Reiser et al.

(10) Patent No.: US 9,551,797 B2
(45) Date of Patent: Jan. 24, 2017

(54) DEVICE AND METHOD FOR READING OUT X-RAY INFORMATION STORED IN A FLUORESCENT STORAGE LAYER

(75) Inventors: Georg Reiser, Munich (DE); Stephan Mair, Augsburg (DE)

(73) Assignee: AGFA HEALTHCARE NV, Mortsel (BE)

( * ) Notice: Subject to any disclaimer, the term of this patent is extended or adjusted under 35 U.S.C. 154(b) by 92 days.

(21) Appl. No.: 13/989,430

(22) PCT Filed: Sep. 22, 2011

(86) PCT No.: PCT/EP2011/004757
§ 371 (c)(1),
(2), (4) Date: May 24, 2013

(87) PCT Pub. No.: WO2012/072158
PCT Pub. Date: Jun. 7, 2012

(65) Prior Publication Data
US 2013/0234048 A1    Sep. 12, 2013

(30) Foreign Application Priority Data
Dec. 3, 2010   (EP) .................................. 10015266

(51) Int. Cl.
*G01T 1/29*     (2006.01)
*G01T 1/20*     (2006.01)
(Continued)

(52) U.S. Cl.
CPC ........... *G01T 1/2014* (2013.01); *G02B 26/085* (2013.01); *G02B 26/101* (2013.01); *G03B 42/08* (2013.01);
(Continued)

(58) Field of Classification Search
CPC ............ G02B 6/085; G02B 6/101; G01T 1/29
(Continued)

(56) References Cited

U.S. PATENT DOCUMENTS 4,856,858 A    8/1989  Koike et al.
5,187,364 A    2/1993  Blais
(Continued)

FOREIGN PATENT DOCUMENTS

EP    1 503 241 A1    2/2005
EP    1 936 405 A1    6/2008
(Continued)

OTHER PUBLICATIONS

International Preliminary Report on Patentability mailed Jun. 13, 2013, from PCT/EP2011/004757, filed on Sep. 22, 2011.
(Continued)

*Primary Examiner* — Yara B Green
(74) *Attorney, Agent, or Firm* — Keating and Bennett, LLP

(57) ABSTRACT

The present invention relates to an apparatus and to a corresponding method for reading out X-ray information stored in a storage phosphor layer (1) comprising a light source (2) for generating a stimulation light beam (3) which can stimulate the storage phosphor layer (1) to emit emission light, and a deflection element (4) for deflecting the stimulation light beam (3) in such a way that the deflected stimulation light beam (3') is moved over the storage phosphor layer (1). In order to achieve the highest possible quality of the X-ray image obtained in the simplest and most cost-effective way possible, a drive device (5) is provided for driving the deflection element (4) by delivering drive energy to the deflection element (4) dependently upon a location of the deflected stimulation light beam (3') and/or dependently upon a position, in particular an angular position, of the deflection element (4).

21 Claims, 4 Drawing Sheets

Figure 1:
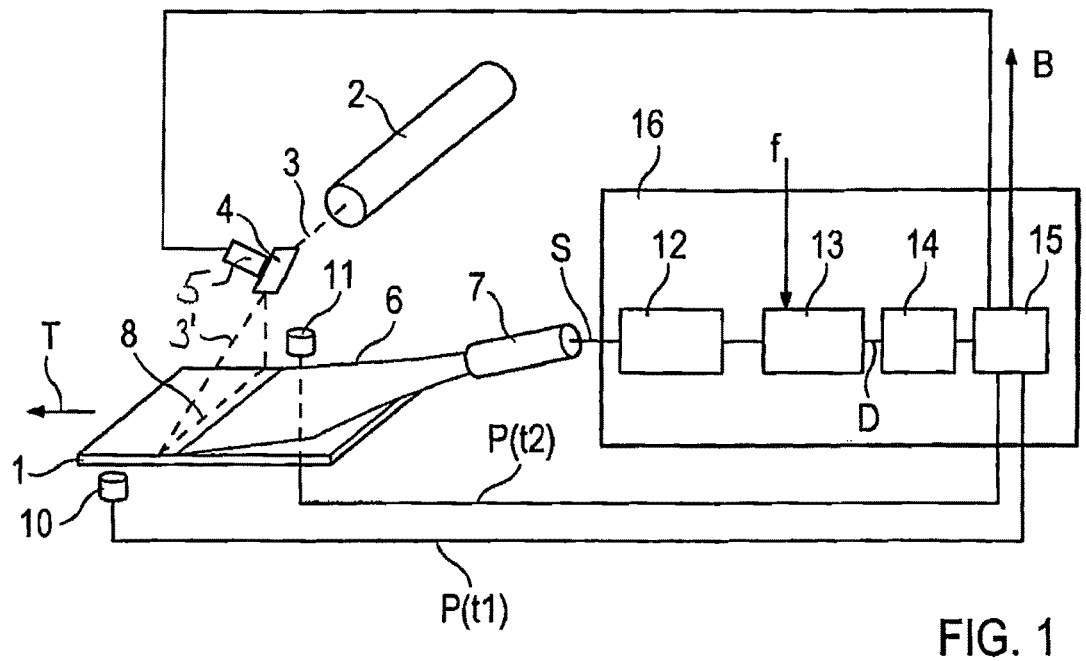

(51) Int. Cl.
*G02B 26/08* (2006.01)
*G02B 26/10* (2006.01)
*G03B 42/08* (2006.01)
*H04N 1/053* (2006.01)
*H04N 1/113* (2006.01)

(52) U.S. Cl.
CPC ............ *H04N 1/053* (2013.01); *H04N 1/1135* (2013.01); *H04N 2201/0412* (2013.01); *H04N 2201/0471* (2013.01); *H04N 2201/04729* (2013.01); *H04N 2201/04732* (2013.01); *H04N 2201/04744* (2013.01); *H04N 2201/04755* (2013.01); *H04N 2201/04789* (2013.01)

(58) Field of Classification Search
USPC ................................. 250/584, 585, 586, 587
See application file for complete search history.

(56) References Cited

U.S. PATENT DOCUMENTS

| | | | |
|---|---|---|---|
| 5,231,575 A * | 7/1993 | Nakajima | G06K 11/00 250/484.4 |
| 5,691,535 A * | 11/1997 | Boutet | G02B 26/101 250/234 |
| 6,239,448 B1 * | 5/2001 | Kawai | G01N 23/04 250/586 |
| 6,642,535 B2 | 11/2003 | Gebele et al. | |
| 7,071,484 B2 | 7/2006 | Lind et al. | |
| 7,122,822 B2 | 10/2006 | Bode et al. | |
| 7,151,272 B2 | 12/2006 | Nitsche et al. | |
| 7,170,080 B2 | 1/2007 | Fasbender et al. | |
| 7,176,476 B2 | 2/2007 | Lind et al. | |
| 7,247,874 B2 | 7/2007 | Bode et al. | |
| 7,304,316 B2 | 12/2007 | Mair | |
| 7,329,891 B2 | 2/2008 | Frankenberger et al. | |
| 7,465,950 B2 | 12/2008 | Mair et al. | |
| 7,485,889 B2 | 2/2009 | Reiser et al. | |
| 7,498,597 B2 | 3/2009 | Bode et al. | |
| 7,507,984 B2 | 3/2009 | Bode et al. | |
| 7,532,402 B2 | 5/2009 | Reiser | |
| 7,544,962 B2 | 6/2009 | Reiser | |
| 7,601,973 B2 | 10/2009 | Frankenberger et al. | |
| 7,612,357 B2 | 11/2009 | Mair et al. | |
| 7,633,078 B2 | 12/2009 | Bode et al. | |
| 8,278,637 B2 | 10/2012 | Mair et al. | |
| 2002/0158537 A1 | 10/2002 | Morita | |
| 2004/0256921 A1 | 12/2004 | Turner et al. | |
| 2005/0029475 A1 * | 2/2005 | Katz | 250/589 |
| 2008/0055390 A1 * | 3/2008 | Klemer et al. | 347/243 |
| 2008/0055587 A1 | 3/2008 | Scherer et al. | |
| 2010/0226557 A1 | 9/2010 | Struye et al. | |
| 2010/0230580 A1 * | 9/2010 | Matsumoto | G01N 21/01 250/208.1 |
| 2010/0252756 A1 * | 10/2010 | Smitt et al. | 250/584 |

FOREIGN PATENT DOCUMENTS

| | | |
|---|---|---|
| EP | 2 461 184 A1 | 6/2012 |
| EP | 2 527 874 A1 | 11/2012 |

OTHER PUBLICATIONS

European Search Report dated Mar. 22, 2011 from priority application EP 10 015 266.9, filed on Dec. 3, 2010.
International Search Report mailed Jan. 25, 2012 from PCT/EP2011/004757, filed on Sep. 22, 2011.

* cited by examiner

DEVICE AND METHOD FOR READING OUT X-RAY INFORMATION STORED IN A FLUORESCENT STORAGE LAYER

The present invention relates to an apparatus and to a corresponding method for reading out X-ray information stored in a storage phosphor layer according to the preamble to the independent claims.

One possibility for recording X-ray images is to store the X-ray radiation passing through an object, for example a patient, as a latent image in a so-called storage phosphor layer. In order to read out the latent image the storage phosphor layer is irradiated with stimulation light and thereby stimulated to emit emission light. The emission light, the intensity of which corresponds to the image stored in the storage phosphor layer, is detected by an optical detector and converted into electrical signals. The electrical signals are further processed as required and finally made available for analysis, in particular for medical/diagnostic purposes, by being displayed on a corresponding display device, such as e.g. a monitor or printer.

In apparatuses and methods according to the prior art the stimulation light beam is mostly deflected by a rotating polygon mirror and conveyed over the storage phosphor layer. In order to guarantee a high quality of the read out X-ray image, a polygon mirror of a high optical and mechanical quality is generally required.

It is the object of the present invention to specify an apparatus and a corresponding method by means of which the highest possible quality of the X-ray image obtained is achieved as easily and inexpensively as possible.

The object is achieved by the apparatus and the method according to the independent claims.

The apparatus according to the invention contains a light source for generating a stimulation light beam which can stimulate the storage phosphor layer to emit emission light and a deflection element for deflecting the stimulation light beam in such a way that the deflected stimulation light beam is moved over the storage phosphor layer, and is characterized by a drive device for driving the deflection element by delivering drive energy to the deflection element dependently upon a location, i.e. the position and/or direction of the deflected stimulation light beam and/or dependently upon a position, in particular an angular position, of the deflection element.

In the corresponding method a stimulation light beam, which can stimulate the storage phosphor layer to emit emission light, is deflected with a deflection element and thereby moved over the storage phosphor layer, the deflection element being driven by drive energy being delivered to the deflection element dependently upon a location, i.e. position and/or direction, of the deflected stimulation light beam and/or dependently upon a specific position, in particular an angular position, of the deflection element.

The invention is based upon the idea of not driving the deflection element continuously, but making the delivery of drive energy to the deflection element dependent upon the deflected stimulation light beam being located in a specific position and/or having a specific direction and/or the deflection element being in a specific angular position. The drive energy is preferably delivered here in portions, e.g. only over specific periods.

By means of the invention the deflection properties of the deflection element are controlled dependently upon the current location of the stimulation light beam or the current angular position of the deflection element so that any changes currently occurring in the behaviour of the deflection element, e.g. thermally caused changes in deflection behaviour, are automatically taken into account when controlling the drive element.

The start time and preferably also the end time for delivering the drive energy to the deflection element are determined according to the invention dependently upon the current position and direction of the deflected stimulation light beam detected by means of appropriate sensors. Alternatively or in addition the current position of the deflection element is detected by means of a pick-up. In this way the delivery of drive energy is triggered when the stimulation light beam is in a specific position or points in a specific direction or when the deflection element is in a specific location. In contrast to a drive produced, for example, simply by synchronisation with a system clock one thus achieves the particular advantage that the respectively most favourable time for the drive of the deflection element in order to achieve the most constant possible deflection behaviour can be matched precisely to the current circumstances during a read-out process of the storage phosphor layer.

By means of the invention a high degree of uniformity in the deflection behaviour of the deflection element is achieved without coming down to the use of deflection elements of a high mechanical and optical quality. Therefore, less expensive deflection elements of a lower quality can also be used. In this way a high quality X-ray image is at the same time guaranteed easily and inexpensively.

Preferably the deflection element has a surface that reflects the stimulation light and which can be displaced by the drive device by oscillating about an axis preferably running parallel to this surface. A deflection element configured in this way can be controlled particularly easily in the manner according to the invention and is, moreover, particularly inexpensive and simple. The advantageous effects of the invention come particularly well into their own here.

In particular, the reflective surface has a resonance frequency which is driven by the drive device in such a way that the resonance frequency of the reflective surface oscillates. A particularly high degree of displacement on the one hand and stability of the deflection characteristics on the other hand are achieved here.

Instead of a reflective surface, a refractive element through which the stimulation light beam is radiated can also be used as the deflection element and thereby deflects or displaces this stimulation light beam in different directions by refraction dependently upon its respective angular position. This type of element could e.g. be a block made of glass or plastic through which the stimulation light beam is radiated.

The reflective surface or the refractive element is mounted elastically, e.g. by helical and/or torsion springs. When displaced from its rest position a reset force is generated which causes the surface or the element to vibrate. By means of the elasticity properties of the elastic mounting in conjunction with the mass of the surface or of the element an eigenfrequency of the system is produced which corresponds to the resonance frequency.

One particular advantage of the invention is that the deflection element can be driven while the latter vibrates at its resonance frequency without the resonance frequency itself having to be determined. Moreover, the drive according to the invention reacts flexibly to any deviations, caused thermally for example, from the resonance frequency because the drive element is not driven at set times, but when driven the current location of the beam or the position of the deflection element is always taken into account. In this way the oscillation of the deflection element at the resonance frequency is also maintained reliably and easily when there are fluctuations in the oscillation.

In one preferred configuration of the invention the drive device is configured in such a way that the delivery of drive energy to the deflection element, in particular after a pre-specified time delay, is triggered when the stimulation light beam is in the specific position and/or direction. In order to detect the specific position and/or direction of the deflected stimulation light beam preferably at least one sensor element is provided. In this way the delivery of drive energy can be matched particularly precisely to the respectively currently given circumstances, in particular to the current position or direction of the deflected stimulation light beam, preferably detected by sensors, so that a particularly high degree of uniformity in the deflection and oscillation behaviour of the deflection element is achieved.

In a further preferred embodiment a detector is provided for detecting the emission light emitted by the storage phosphor layer, the detector being configured in such a way or the apparatus being controlled in such a way that the detector detects the emission light emitted by the storage phosphor layer while the deflected stimulation light beam moves over the storage phosphor layer in a first direction of movement or while the deflection element moves in a first direction. Preferably the detector does not detect any emission light when the deflected stimulation light beam or the deflection element moves in the opposite direction of movement or direction. In particular, the light source is switched off here so that, as it were, only a notional stimulation light beam is moved over the storage phosphor layer in the opposite direction of movement.

Preferably the drive device is configured in such a way that the delivery of drive energy to the deflection element is triggered when the deflected stimulation light beam is moved over the storage phosphor layer in a second direction of movement opposite to the first direction of movement or when the deflection element moves in a second direction opposite to the first direction. This means that the delivery of drive energy is triggered when the deflected stimulation light beam passes over at least one of the two sensor elements during the movement in the second direction of movement and is accordingly located in a specific position and/or direction. The same applies to the location and movement of the deflection element. In this way the deflection element is driven during the retrace of the deflected stimulation light beam. In this way one achieves the advantage that the irregularities in the oscillation of the deflection element possibly occurring temporarily due to a drive pulse have already faded away again when the deflected stimulation light beam moves over the storage phosphor layer in the subsequent movement in the first direction of movement. In this way a particularly high degree of uniformity is easily achieved in the deflection and oscillation behaviour.

It is particularly preferable to configure the drive device in a way such that no drive energy is delivered to the deflection element when the stimulation light beam is moving over the storage phosphor layer in the first direction of movement. In addition to the advantage described above, one achieves the positive effect here that any electromagnetic interference due to a drive pulse can not have a disruptive effect upon subsequent detection of emission light. In this way a particularly high quality of the X-ray image read out is obtained.

Due to the non-immediately previously stimulated free movement, in particular oscillation, of the deflection element during the movement in the first direction of movement of the deflected stimulation light beam the scanning of the storage phosphor layer can also be called ballistic scanning.

In a further preferred configuration the deflection element has a magnetic, in particular ferromagnetic and/or permanent magnetic element. The drive device has an electromagnetic unit, in particular an electromagnet, which can interact with the magnetic element and thereby deliver drive energy to the deflection element. In this way precise, controllable delivery of drive energy is easily implemented.

Moreover, it is preferred if the drive device is designed to deliver the drive energy in the form of pulses. The duration and/or height of the pulses are preferably chosen here by a pulse width or pulse height modulation so that the amplitude of the deflection of the oscillating deflection element is constant. In particular, the pulses have a pulse duration which is shorter than half the period duration with which the deflection element, in particular the reflective surface, oscillates. In this way it is achieved that the period for delivering drive energy can be restricted to one cycle of the oscillation movement of the deflection element in which the latter moves in one direction. If one chooses a sufficiently small pulse duration for the delivery of the drive energy, a reliable drive of the deflection element is also guaranteed for the case where the deflection element temporarily executes higher frequency oscillations with shorter period durations.

In a further preferred configuration the apparatus has a conveyance device by means of which the storage phosphor layer can be brought into a curved form. The curvature of the storage phosphor layer is preferably cylindrically concave here so that the stimulation light beam deflected by the deflection element always strikes the storage phosphor layer perpendicularly on its path over the storage phosphor layer. In this way, when reading out level storage phosphor layers, the generally required post-scan optics and calculative elimination of distortion in the read out X-ray image can be dispensed with. The structure of the apparatus and the method thus become even simpler, without any negative impact upon the image quality.

In a likewise preferred further development of the invention at least one mass element is provided by means of which the deflection behaviour of the deflection element can be or is influenced.

In an alternative invention an apparatus and a method according to the preamble to the independent claims are characterised in that at least one mass element is provided by means of which the deflection behaviour of the deflection element can be or is influenced.

This further development or invention is based upon the idea of providing in addition to the actual deflection element, e.g. a mirror and/or a refractive element, a mass element due to the additional mass of which the oscillatory or rotatory movement behaviour of the deflection element is changed with respect to a deflection element without a mass element and can thus be specifically optimised with regard to different requirements.

In this way in particular the sensitivity of the deflection element to impacts can be considerably reduced by the stimulation of undesired natural vibrations about an axis perpendicular to the axis of rotation or oscillation and/or of additional angular momentum about the axis of rotation or oscillation of the deflection element being able to be prevented efficiently by an appropriate arrangement of the mass elements. Moreover, due to air turbulence due to the vibrational movement forces also affect the system symmetrically and so do not stimulate the aforementioned vibration modes.

The quality of the X-ray image read out from the storage phosphor layer is thus clearly improved.

In particular with an oscillating deflection element the mass element is arranged such that the centre of gravity of the overall mass formed by the deflection and the mass element comes to lie on the oscillation axis. This is achieved most simply by a mass element the form and mass of which are substantially identical to the deflection element. Thus, undesired natural oscillations or additional angular moment are avoided easily and inexpensively.

Preferably, at least one elastic element is provided on which the deflection element is mounted, in particular fastened. The elastic element is preferably a torsion spring, e.g. in the form of a strip of spring steel or a spiral or helical spring. The deflection element is preferably configured such that the latter can deflect the stimulation light beam by reflection and/or refraction. In particular, the deflection element is in the form of a mirror which has a flat mirror body with a surface reflecting the stimulation light.

The mass element can be attached to the deflection element and/or to the elastic element. Preferably the deflection element is adhered to the elastic element, in particular a torsion spring. For this purpose a pre-defined surface can be provided on the torsion spring. In particular, the deflection element is attached to a first side of the torsion spring and the mass element is attached to a second side of the torsion spring lying opposite the first side. These measures also contribute individually or in combination to undesired natural vibrations and additional angular momentum being efficiently prevented in a particularly simple and inexpensive way.

Preferably, the mirror and the mass element, that constitutes a counter-body to the mirror, respectively have a rectangular or round form and have a substantially planar front and rear side.

Moreover, it is preferable to configure the deflection element and/or the mass element aerodynamically by e.g. its edges being slanted and/or a gap optionally formed between the deflection element and the mass element being closed at least in the edge region. In this way the dissipation of energy, i.e. energy loss, of the oscillating system can be reduced and a possible effect of air turbulence upon the oscillation can be further reduced.

Figure 2:
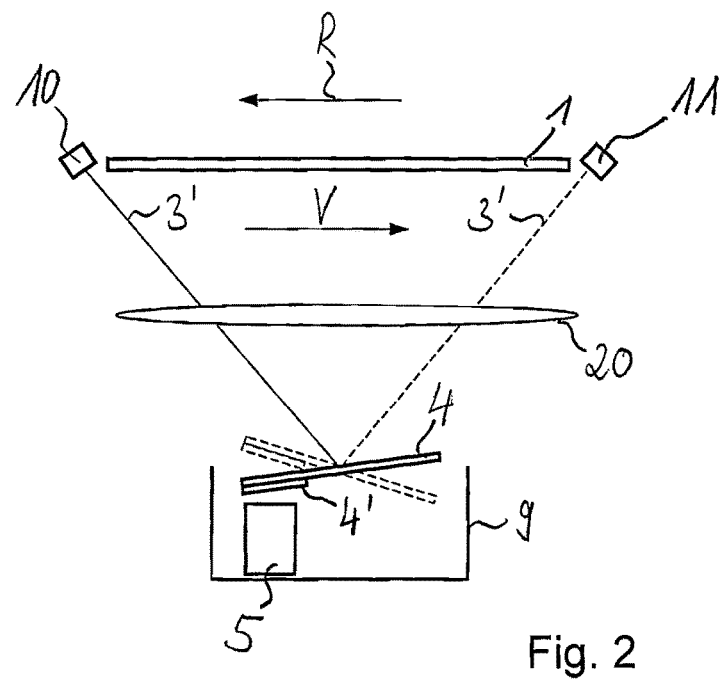
Figure 3:
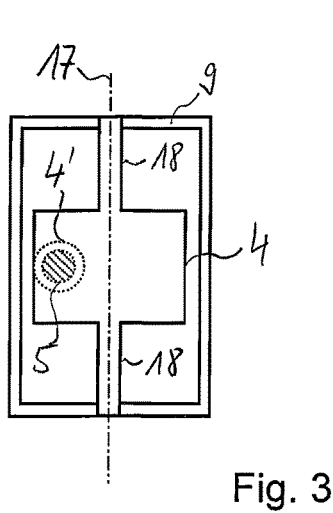
Figure 4:
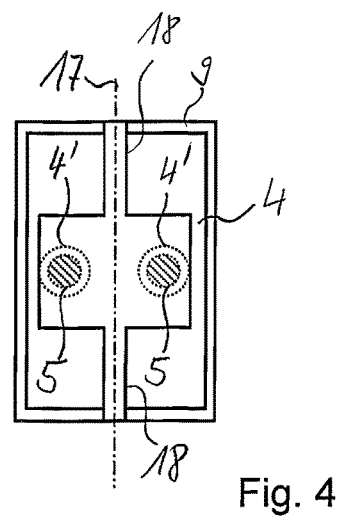
Figure 5:
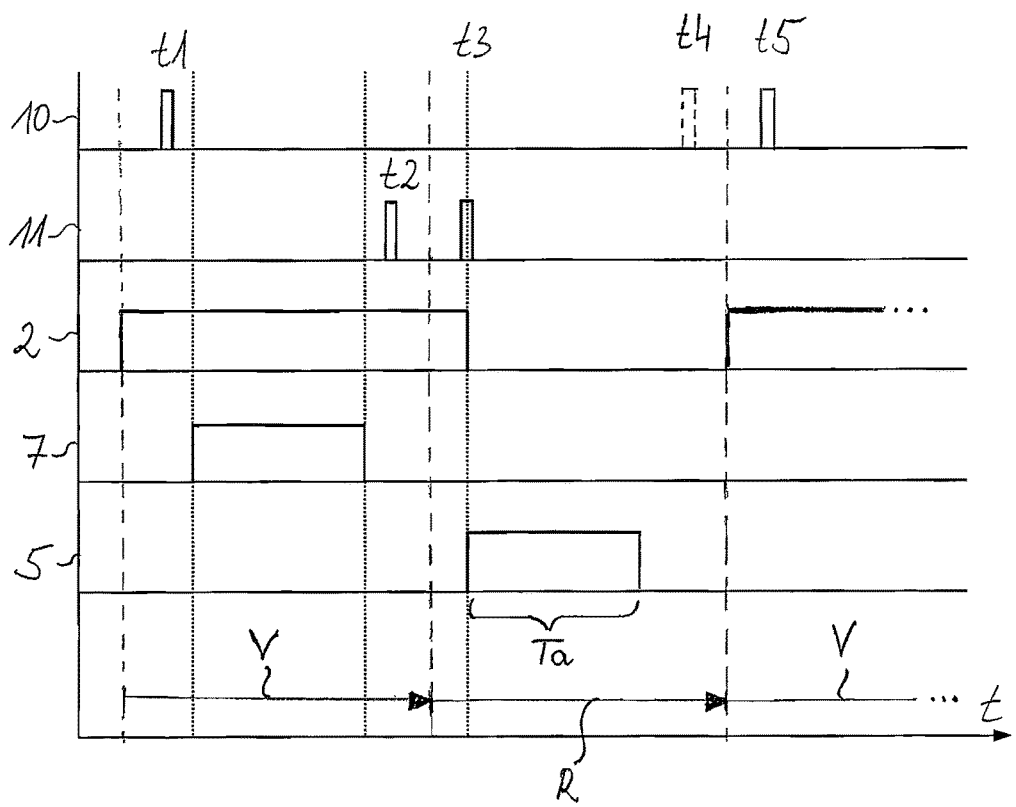
Figure 6:
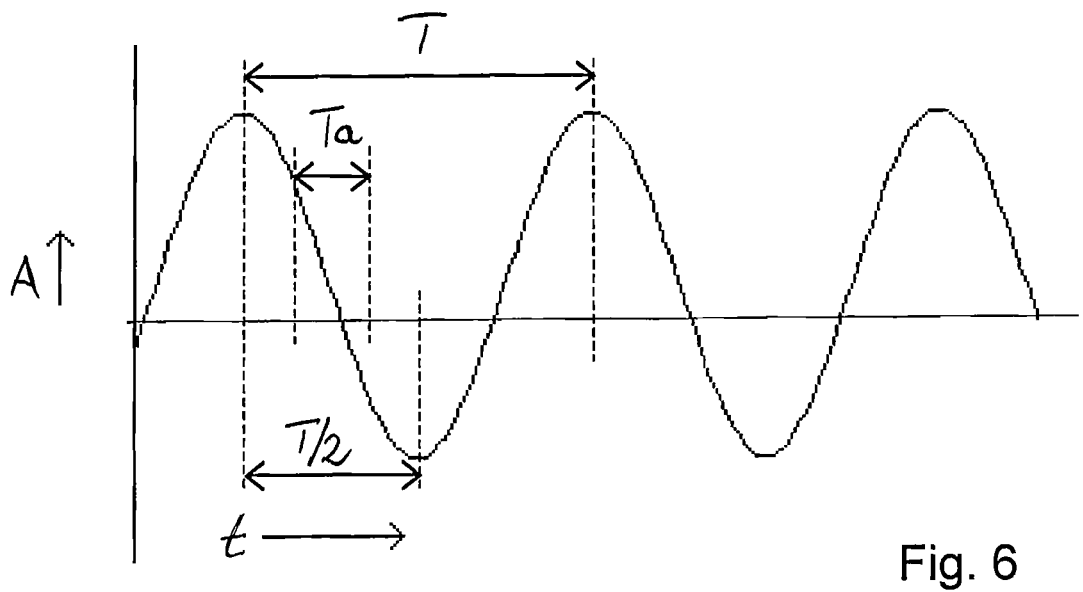
Figure 7:
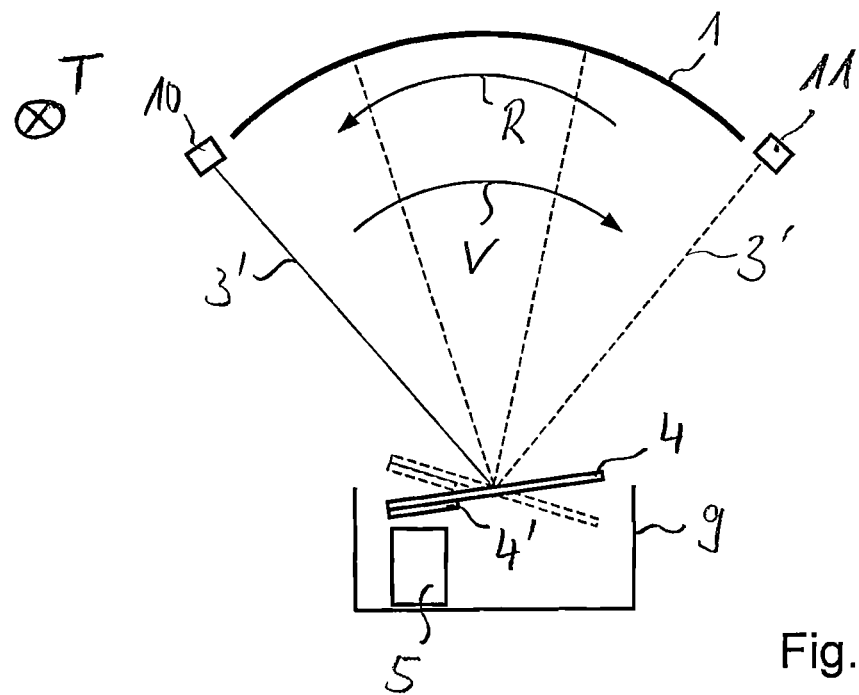

Further advantages, features and possible applications of the present invention emerge from the following description in connection with the figures. These show as follows:

FIG. 1 a schematic illustration of an example of an apparatus for reading out storage phosphor layers;

FIG. 2 a side view of a first example of use of the deflection element;

FIG. 3 a top view of a first example of a deflection element;

FIG. 4 a top view of a second example of a deflection element;

FIG. 5 an example of a chronological sequence of control of the apparatus;

FIG. 6 an example intended to illustrate one preferred aspect of the control of the apparatus;

FIG. 7 a side view of a second example of use of the deflection element; and

Figure 8:
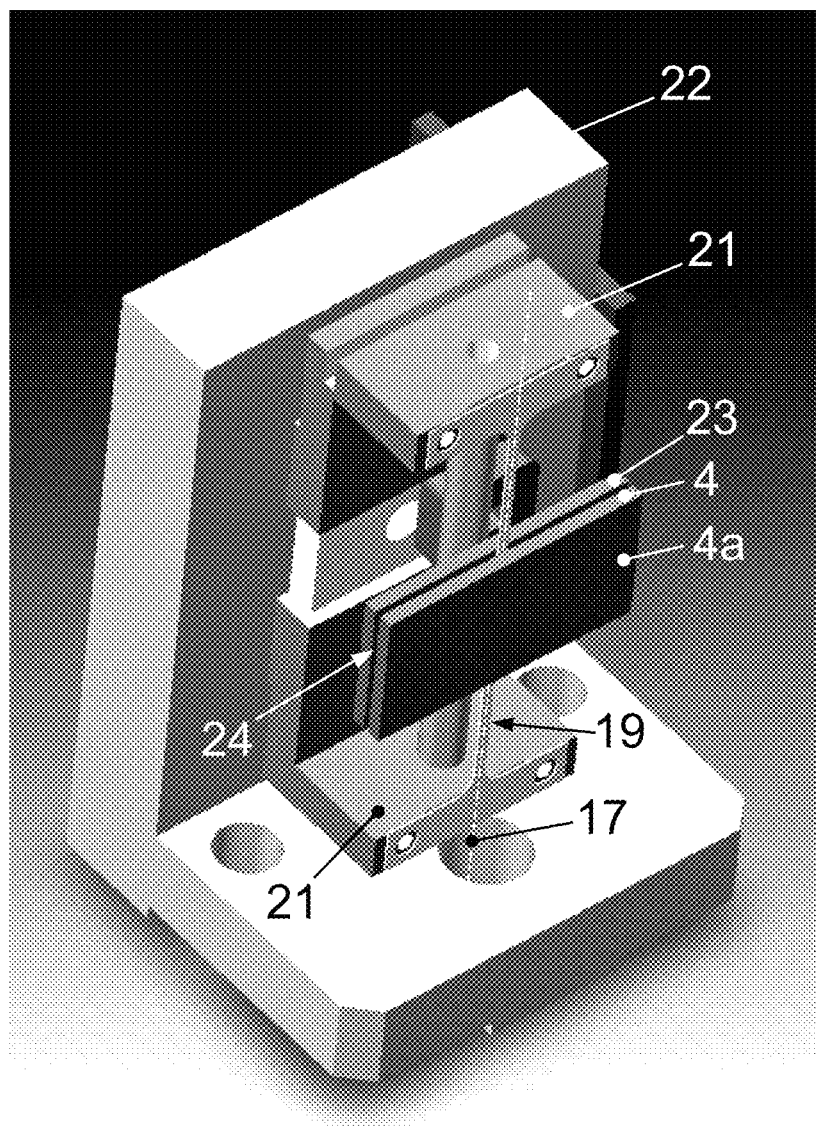

FIG. 8 a perspective illustration of a deflection element.

FIG. 1 shows an apparatus for reading out a storage phosphor layer 1. By means of a laser 2 a stimulation light beam 3 is generated which is deflected by a deflection element 4 such that said light beam moves over the storage phosphor layer 1 to be read out along a line 8. The deflection element 4 has a reflective surface, in particular in the form of a mirror, which is caused to oscillate by a drive device 5.

During the movement of the deflected stimulation light beam 3' over the storage phosphor layer 1 the latter emits emission light dependently upon the X-ray information stored in said storage phosphor layer and which is collected by an optical collecting device 6, for example a bundle of optical fibres or an appropriate mirror device and is detected by an optical detector 7, preferably a photomultiplier (PMT) and is thereby converted into a corresponding detector signal S.

The detector signal S is conveyed to a processing device 16 in which image signal values B for individual pixels of the read out X-ray image are derived. If the read out line 8 is composed, for example, of 1000 pixels, 1000 corresponding image signal values B are derived from the detector signal S obtained when reading out the line 8.

By conveying the storage phosphor layer 1 in conveyance direction T by means of a conveyance device (not shown), successive reading out of individual lines 8 of the storage phosphor layer 1 is achieved, and so a two-dimensional X-ray image composed of individual pixels each having a corresponding image signal value B is obtained. If the number of lines 8 read out in conveyance direction T is for example 1500, with 1000 pixels respectively for each line 8 a total of 1500 times 1000 pixels are obtained for the read out X-ray image with respectively one corresponding image signal B.

It is basically also possible to mount the storage phosphor layer 1 stationarily and to move the remaining components, in particular the laser 2, deflection element 4, collecting device 6 and detector 7 relative to the storage phosphor layer 1.

The detector signal S is first of all filtered by a low pass filter 12, higher frequency portions of the detector signal S, in particular noise components, being eliminated. The filtered detector signal S is then conveyed to an analogue to digital converter 13 and sampled here with a sampling frequency f, with every sampling process a detector signal D being obtained in respective digital units. The sampling of the detector signal S in the analogue to digital converter 13 is preferably implemented using the so-called sample and hold principle according to which, when sampling, the respective current analogue signal height of the detector signal S at the analogue to digital converter 13 at a sampling time is held and converted into a corresponding digital detector signal value D. After intermediate storage in the memory 14 the image signal values B are calculated from the detector signal values D in a control unit 15.

The apparatus shown further comprises two sensors 10 and 11 which are arranged on both sides of the storage phosphor layer in such a way that the deflected stimulation light beam 3' can strike the latter before and after the light beam passes or has passed over the storage phosphor layer 1 along the line 8. If the stimulation light beam 3 is deflected with the deflection element 4 towards the line 8, said light beam first of all passes the first sensor 10 and then the second sensor 11 before actually sampling the line. The light of the deflected stimulation light beam 3' is thereby detected by the two light-sensitive sensors 10 and 11 and converted into corresponding electrical signals P(t1) and P(t2) at times t1 and t2 and conveyed on to the control unit 15 of the processing device 16.

The control unit 15 is connected to the drive device 5 in order to drive the deflection element 4 and controls the latter in such a way that the deflection element 4 is only driven actively by the delivery of drive energy from the drive device 5 when or after the deflected stimulation light beam 3' has adopted a specific direction and/or position. In the example shown the deflected stimulation light beam 3' passes over at least one of the two sensors 10 and 11, whereupon said stimulation light beam 3' sends an electric pulse P to the control unit 15 which—optionally after a specifiable time delay—controls the drive device 5 in such a way that the latter intermittently delivers drive energy, in particular in the form of a drive energy pulse, to the oscillating deflection element 4 and thereby maintains its oscillation, preferably in the range of a resonance frequency of the deflection element 4. This will be explained in more detail below.

FIG. 2 shows a side view of a first example of use of a deflection element 4. FIG. 3 shows the corresponding deflection element in a top view.

The deflection element 4 has a reflective surface which is applied to a housing 9 over strip-shaped extensions 18. The strip-shaped extensions 18 are preferably formed in one piece with the reflective surface of the deflection element 4, but can also be produced separately from the latter and then be connected to the latter. The strip-shaped extensions 18 constitute a torsion spring by means of which, when the deflection element 4 is displaced about an axis 17 running along the extensions 18 a reset force is generated which displaces the deflection element 4 in the opposite direction etc. In this way the deflection element 4 is stimulated to oscillate about the axis 17.

The displacement of the deflection element 4 is preferably implemented by an electromagnet 5 which, by applying an electric voltage and the associated current flow, generates a magnetic field that acts on a magnetic element 4' located on the deflection element 4. Depending on the material of the magnetic element 4' the latter can be attracted and also repelled, or only be attracted by the electric magnet 5. The former is the case when the magnetic element has permanent magnetic substances. The latter is the case when using a ferromagnetic material, the magnetisation of which is not retained permanently.

In order to first of all bring the deflection element 4 from its rest position into an oscillating state voltage pulses of a specific duration and frequency are continuously applied to the electromagnet 5, by means of which the amplitude of the oscillation of the deflection element 4 finally becomes so great that the deflected stimulation light beam 3' runs over the width of the storage phosphor layer 1 to be sampled and thereby also strikes the first or second sensor 10 or 11 in particular.

In the example shown there is provided between the deflection element 4 and the storage phosphor layer 1 an optical device 20, so-called post-scan optics by means of which the deflected stimulation light beam 3' is on the one hand focussed onto the storage phosphor layer 1 and on the other hand its radial movement is converted into a linear movement along the line 8 on the storage phosphor layer 1.

Alternatively or in addition to post-scan optics a so-called variofocus can also be used which is arranged between the laser 2 and the deflection element 4 (so-called pre-scan optics) and forms the laser beam 3 such that after its deflection by the deflection element 4 a linear movement along the line 8 on the storage phosphor layer 1 is also obtained. Post-scan optics can then be dispensed with.

However, it is basically also easily possible to totally dispense with the optical device 20 and to subtract the distortions that then occur from the X-ray image obtained, for example by means of information on the behaviour of the stimulation light beam established before reading out.

FIG. 4 shows a top view of a second example of a deflection element 4 which, unlike the example shown in FIG. 3, can be stimulated to oscillate about the axis 17 not only by means of an electromagnet 5, but by means of two electromagnets 5 and the corresponding magnetic elements 4' on the lower side of the deflection element 4. In this version the two electromagnets 5 are preferably controlled such that one electromagnet 5 repels the corresponding magnetic element 4' on one side of the deflection element 4 and the other electromagnet 5 attracts the corresponding magnetic element 4' on the other side of the deflection element 4. In this way it is made possible to deliver a particularly high measure of drive energy at the desired time. Moreover, for this example the comments made in connection with FIGS. 2 and 3 apply accordingly.

In the following the chronological sequence of the control of the apparatus including the deflection element 4 is explained in more detail by means of FIGS. 5 and 6, reference being made to FIGS. 1 and 2.

In the chosen illustration of FIG. 5 the chronological sequence of signals and states of the individual components of the apparatus (see FIG. 1) is shown, namely of the first sensor 10 the second sensor 11, the laser 2, the detector 7 and the electromagnet 5 on the deflection element 4. The shown sequence of the respective state of the laser 2, the detector 7 and the electromagnet 7 is to be interpreted here to the effect that the laser 2, detector 7 or electromagnet 5 is active and generates stimulation light, detects emission light and delivers drive energy if a sequence different from the zero line is shown.

If the stimulation light beam 3 is deflected by the oscillating deflection element 4, the deflected stimulation light beam 3' moving in direction V (so-called trace phase) first of all passes over the sensor 10 at the time t1, whereupon said sensor sends a corresponding sensor signal P(t1) to the control unit 15. This sensor signal is also called the Begin Of Line signal (BOL).

After a specifiable time span after which the deflected stimulation light beam 3' has reached the storage phosphor layer 1, the emission light stimulated by the deflected stimulation light beam 3' is detected by the detector 7. After passing through the line 8 of the storage phosphor layer 1 the stimulation light beam 3' finally leaves the storage phosphor layer 1 and passes over the second sensor 11 at time t2, whereupon the latter also generates a corresponding sensor signal P(t2). This sensor signal is also called the End Of Line signal (EOL).

Due to the oscillation movement of the deflection element 4 the latter now executes a backwards movement after its maximum deflection, upon which the deflected stimulation light beam 3' now moving in the backwards direction R (so-called retrace phase) once again passes over the second sensor 11 at a time t3, whereupon said second sensor in turn sends a corresponding sensor signal to the control unit 15. This then switches the laser 2 off and causes the electromagnet 5 to generate a magnetic field by means of which drive energy is transmitted to the oscillating deflection element 4.

Transmission of the drive energy only takes place here over a specific duration Ta and preferably during the retrace of the deflection element 4 or during the notional retrace of the deflected (switched off) stimulation light beam 3' in direction R. The duration Ta of stimulation of the deflection element 4 is preferably shorter here than half the period duration T of a full oscillation movement, i.e. a complete to and fro movement of the deflection element 4.

This is illustrated in FIG. 6 which shows the sequence of the amplitude A of the oscillating deflection element, i.e. its deflection over the time t. T indicates the period duration of a full oscillation of the deflection element 4. The preferred duration Ta for delivery of drive energy to the deflection element 4 is, as can be seen in FIG. 6, shorter than half the period duration T/2 of the oscillation and preferably only starts to run at the time when the maximum displacement of the deflection element 4 has already been exceeded. The time of this maximum displacement lies exactly in the middle between the two times t2 and t3 drawn in in FIG. 5.

By means of the described selection of the duration Ta and of the period, i.e. the temporal location of the duration Ta it is achieved for stimulation of the deflection element 4 that drive energy can always only be conveyed to the deflection element 4 during the movement in a direction of movement, and in fact also when the frequency of the oscillation of the deflection element 4 temporarily changes somewhat, in particular becomes somewhat greater, and this results in a temporary shortening of the current period duration T.

On its notional path in the retrace phase in direction R over the storage phosphor layer 1 the (switched off) stimulation light beam 3' leaves the storage phosphor layer 1 and at time t4 reaches the first sensor 11, the notional sensor signal of which at time t4 is drawn in in FIG. 6. After the vibrating deflection element 4 changes direction, the laser 2 is switched on again and at a time t5 the deflected stimulation light beam 3' passes over the first sensor 10 again which generates a corresponding Begin Of Line signal (BOL). The sequence described above now starts again, a next line 8 of the storage phosphor layer 1 being read out.

As already mentioned, it is also possible by means of the sensors, alternatively or in addition to detection of the location, i.e. position or direction, of the deflected stimulation light beam 3', to provide a pick-up, preferably in the form of a coil, which can detect the current position of the deflection element 4. The pick-up supplies a corresponding pick-up signal when the oscillating deflection element 4 changes its position. For example, one of the two electromagnets 5 in the example shown in FIG. 4 can be designed to deliver drive energy, while the second electromagnet 5 takes on the function of the pick-up, the corresponding magnetic element 4' of this electromagnet 5 being permanently magnetic in form. A relative movement between the element 4' and the coil of the electromagnet 5 during the oscillation of the deflection element 4 then induces in the coil a voltage which can be analysed as a pick-up signal, it being possible in particular to detect e.g. the passing through of a turn-around point. Dependently upon the corresponding pick-up signal the delivery of drive energy to the deflection element can then be controlled, in particular triggered.

The invention has been described above by means of a series of specific preferred examples. Further advantageous variations or alternatives are described in more detail below.

In principle, drive energy can also be delivered in the trace phase. Basically, drive energy can be delivered to the deflection element 4 both in the trace and in the retrace phase. Here in fact, there is then no more so-called ballistic scanning during detection of the emission light, and cross-talking of the drive pulse onto the electronics when recording data can not be ruled out either. Nevertheless one achieves the advantage here that due to the respectively smaller amounts of drive energy per unit of time respectively shorter drive pulses can be chosen, and this also guarantees a reliable drive of the deflection element, even with higher frequency oscillations, as has already been explained above.

The form of the drive pulses when delivering the drive energy can be that of a rectangle, as shown in FIG. 5 in relation to the electromagnet 5. Alternatively, the form of the drive pulses can however also be one different from the rectangular form, in particular any form. In this way e.g. the occurrence of electromagnetic interference signals can be greatly reduced or even greatly hindered, and this clearly improves the electromagnetic compatibility (EMC) of the apparatus.

The drive pulse can also have a pulse duration Ta that is longer than a half period T/2 of the oscillation. An associated "braking effect" upon the deflection element 4 may be desirable under certain conditions and accordingly be advantageous.

Moreover, the polarity of the drive pulse can change, the change in polarity preferably, but not necessarily, being made at a turn-around point of the oscillation. In this way too effective driving of the vibration can be realised.

It is basically possible to not deliver drive energy to the deflection element 4 in every oscillation period of the deflection element 4, but only in every second, third or higher period. The drive energy may also only be delivered as required, when e.g. the amplitude of the displacement of the deflection element 4, which can be reliably detected by the pick-up, has fallen below a specific value. Alternatively or in addition, drive energy may only be delivered to the deflection element e.g. as soon as an EOL and/or a BOL signal is no longer being generated by the sensors 10 and 11.

The control of the drive device 5 described above must not necessarily be implemented dependently upon the detected so-called BOL or EOL signals. Instead of BOL or EOL sensors 10 and 11 arranged substantially in the plane or in the course of curvature of the storage phosphor layer 1 (see FIGS. 2 and 7), particular photodiodes or other position- and time-sensitive sensors can also be provided which do not necessarily have to lie in the plane or in the course of curvature of the storage phosphor layer 1.

In particular for a start-up algorithm associated with the drive for stimulating the oscillation of the deflection element 4 from its rest position, a sensor (not shown) close to the rest position of the deflection element 4 can be advantageous which however, as considered from the deflection element 4, lies behind the plane of the storage phosphor layer 1 so that it only serves to detect the deflected stimulation light beam 3' before the storage phosphor layer 1 is inserted, whereas it is covered by the latter during the actual read out with the storage phosphor layer 1 inserted.

FIG. 7 shows a side view of a second example of use of the deflection element 4. Unlike the example shown in FIG. 2, the storage phosphor layer 1 is not level, however, but curved. The course of the curvature of the storage phosphor layer 1 corresponds substantially to the course of curvature of part of a lateral surface of a cylinder, the axis of which is aligned parallel to the direction of conveyance T running perpendicular to the plane of the drawing (see FIG. 1). Preferably the axis of the cylinder of the lateral surface of the cylinder runs parallel to the oscillation axis 17 (see FIGS. 3 and 4), in particular close to or on the oscillation axis 17, of the deflection element 4. The advantage of this type of curvature with respect to reading out a level storage phosphor layer 1 (see FIG. 2) is that one can dispense with special optical devices (see post-scan optics in FIG. 2) between the deflection element 4 and the storage phosphor layer 1, and this simplifies the structure of the apparatus. In this way it is at the same time guaranteed that the deflected stimulation light beam 3' always strikes the respective section of the storage phosphor layer 1 substantially perpendicularly, and this leads to a particularly high light yield when the emission light is stimulated while at the same time avoiding negative effects upon the image quality due to the scattering of stimulation light in the storage phosphor layer 1. Moreover, the comments made with regard to FIG. 2 apply correspondingly.

The invention has been described in more detail above in connection with the read out of storage phosphor layers. A plurality of advantages achieved in this way can also be achieved, however, by sampling or labelling other media, such as e.g. documents or arbitrary objects, and so the invention does not have to be restricted to the reading out of storage phosphor layers.

Therefore the invention also comprises an apparatus for sampling or labelling a medium with a light source in order to generate a light beam, and a deflection element for deflecting the light beam in such a way that the light beam is moved over the medium. The apparatus is characterised by a drive device for driving the deflection element by delivering drive energy to the deflection element dependently upon a specific position and/or direction of the deflected light beam.

Also considered to be the invention is an apparatus (see FIG. 1) for reading out X-ray information stored in a storage phosphor layer 1 comprising a light source 2 for generating a stimulation light beam 3 which can stimulate the storage phosphor layer 1 to emit emission light and a deflection element 4 for deflecting the stimulation light beam 3 in such a way that the deflected stimulation light beam 3' is moved over the storage phosphor layer 1, the apparatus being characterised alternatively or additionally to the drive device 5 by at least one mass element by means of which the movement and/or deflection behaviour of the deflection element 4 can be influenced. Also considered to be the invention is a corresponding method. This will be described in more detail below.

FIG. 8 shows a corresponding deflection element 4 in a perspective illustration. In the present example the deflection element 4 is in the form of a mirror which comprises a substantially flat, box-shaped mirror body which has on the front flat side 4a a mirror surface on which the stimulation light beam 3 (see FIG. 1) can be at least partially reflected. The deflection element 4 is fastened by its rear flat side to the front side of an "H"- or "double T"-shaped torsion spring 19, for example by adhesive bonding, and this on its part is attached to holders 21, for example by means of screws, rivets and/or by adhesive bonding. The holders 21 are attached to a frame 22 which can be mounted in the apparatus.

The deflection element 4 is caused to vibrate about the oscillation axis 17 by appropriate elements, for example by at least one magnetic element located on the deflection element 4 and at least one electromagnet on the frame 22, the above comments in connection with FIGS. 2 to 7 applying correspondingly.

Attached, for example by adhesive bonding, to the rear side of the torsion spring 19 is a mass element 23 the form and mass of which correspond substantially to the deflection element 4, i.e. it also has a flat, block-shaped body and has approximately the same mass. Alternatively, however, it is also possible for the mass element 23 to have a form similar to the form of the deflection element 4 in the geometric sense and which is obtained, for example, by centric elongation.

Basically however the deflection element 4 and the mass element 23 can also be of different forms and be made, for example, as round, e.g. circular or elliptical, flat discs. In this version too it is preferred if the deflection element 4 and the mass element 23 have a substantially identical form and mass or at the very least the forms of the deflection element 4 and the mass element 23 are similar in the geometric sense.

Preferably the configuration of the deflection element 4 and/or the mass element 23 can be designed aerodynamically by e.g. their edges being slanted and/or the gap 24 formed between the deflection element 4 and the mass element 23 being closed at least in the edge region or in parts of the edge region. This is achieved, for example, by introducing and/or applying an appropriate filler which is mixed e.g. with adhesive, and so is self-curing, or with some other appropriate sealing compound such as e.g. putty.

Unlike the deflection element 4, with the mass element 23 one can dispense with a mirror surface. Preferably the deflection element 4 comprises a rectangular glass plate with a mirror surface applied to the glass plate, in particular by vapour or galvanic deposition, whereas substantially the same glass plate is used as the mass element 23.

By means of the mass element 23 provided in addition to the deflection element 4, in particular in the form of identical glass plates, it is achieved that the centre of mass of the overall mass formed by the deflection and the mass element 4 and 23 comes to lie on the oscillation axis 17, and in fact precisely in the centre of the height of the region of the torsion spring 19 covered by the deflection element 4 and the mass element 23.

By means of the measured specified above, the oscillation behaviour of the deflection element 4 is improved to the effect that its sensitivity to impacts from the outside is considerably reduced by the stimulation of undesired natural vibrations and/or additional angular momentum of the deflection element 4 about its oscillation axis 17 being efficiently prevented. Moreover, forces also affect the deflection element/mass element 4/23 system symmetrically due to air turbulence due to the vibrational movement, and so stimulation of the aforementioned undesired vibration modes does not take place. The quality of the X-ray image read out is thus clearly improved.

The invention claimed is:

1. An apparatus for reading out X-ray information stored in a storage phosphor layer, the apparatus comprising:
   a light source configured to generate a stimulation light beam which stimulates the storage phosphor layer to emit emission light;
   a deflection element configured to deflect the stimulation light beam to move the deflected stimulation light beam over the storage phosphor layer;
   at least one sensor element configured to detect a location of the deflected stimulation light beam and to generate an electrical signal corresponding to the detected location of the deflected stimulation light beam;
   a drive device configured to drive the deflection element by delivering drive energy to the deflection element; and
   a control unit configured to receive the electrical signal from the at least one sensor element and to control the drive device to start delivering the drive energy to the deflection element in response to and dependent upon the electrical signal corresponding to the detected location of the deflected stimulation light beam.

2. The apparatus according to claim 1, wherein the drive device is configured deliver the drive energy to the deflection element when the deflected stimulation light beam or the deflection element is in a specific location or position, respectively.

3. The apparatus according to claim 1, further comprising at least one pick-up configured to detect a position of the deflection element.

4. The apparatus according to claim 1, further comprising a detector configured to detect the emission light emitted by the storage phosphor layer while the deflected stimulation light beam moves over the storage phosphor layer in a first direction of movement or while the deflection element moves in a first direction.

5. The apparatus according to claim 4, wherein the drive device is configured to deliver drive energy to the deflection element when the deflected stimulation light beam is moved in a second direction of movement opposite to the first direction of movement or when the deflection element moves in a second direction opposite to the first direction.

6. The apparatus according to claim 4, wherein the drive device is configured to deliver no drive energy to the deflection element when the deflected stimulation light beam is moving in the first direction of movement or when the deflection element is moving in the first direction.

7. The apparatus according to claim 1, wherein the deflection element includes a magnetic element and the drive device includes an electromagnetic unit which interacts with the magnetic element to deliver drive energy to the deflection element.

8. The apparatus according to claim 1, wherein the deflection element includes a reflective surface which is driven by the drive device to oscillate.

9. The apparatus according to claim 8, wherein the reflective surface has a resonance frequency and the drive device drives the deflection element at the resonance frequency of the reflective surface.

10. The apparatus according to claim 1, wherein the drive device is configured to deliver the drive energy in a form of pulses.

11. The apparatus according to claim 10, wherein the deflection element oscillates with a period duration and the pulses have a pulse duration which is shorter than half the period duration.

12. The apparatus according to claim 1, further comprising a conveyance device configured to curve the storage phosphor layer during the reading out of the X-ray information.

13. The apparatus according to claim 1, further comprising at least one mass element configured to adjust a deflection behaviour of the deflection element.

14. The apparatus according to claim 1, wherein the drive device is configured to deliver the drive energy to the deflection element dependent upon an angular position of the deflection element.

15. A method for reading out X-ray information stored in a storage phosphor layer, the method comprising the steps of:
generating a stimulation light beam to stimulate a storage phosphor layer to emit emission light;
deflecting the stimulation light beam with a deflection element to move the stimulation light over the storage phosphor layer;
detecting a location of the deflected stimulation light beam and generating an electrical signal corresponding to the detected location of the deflected stimulation light beam; and
receiving the electrical signal corresponding to the detected location of the deflected stimulation light beam and starting delivery of a drive energy to the deflection element in response to and dependent upon the electrical signal corresponding to the detected location of the deflected stimulation light beam.

16. The method according to claim 15, wherein the step of starting delivery includes starting delivery of the drive energy to the deflection element when the deflected stimulation light beam or the deflection element is in a specific location or position, respectively.

17. The method according to claim 15, wherein the step of starting delivery includes delivering the drive energy in a form of pulses.

18. The method according to claim 15, further comprising the step of:
using a mass element to adjust a deflection behaviour of the deflection element.

19. The method according to claim 15, wherein the step of starting delivery includes starting delivery of the drive energy to the deflection element dependent upon an angular position of the deflection element.

20. An apparatus for reading out X-ray information stored in a storage phosphor layer, the apparatus comprising:
a light source that generates a stimulation light beam which stimulates the storage phosphor layer to emit emission light;
a deflector that deflects the stimulation light beam to move the deflected stimulation light beam over the storage phosphor layer;
at least one sensor that detects a location of the deflected stimulation light beam and that generates an electrical signal corresponding to the detected location of the deflected stimulation light beam;
a driver that drives the deflector by delivering drive energy to the deflector;
a detector that detects the emission light emitted by the storage phosphor layer; and
a controller that:
controls the detector to detect the emission light only while the deflected stimulation light beam moves over the storage phosphor layer in a first direction of movement; and
controls the driver to start delivering the drive energy to the deflector in response to and dependent upon the electrical signal corresponding to the detected location of the deflected stimulation light; wherein
the controller controls the driver to deliver the drive energy to the deflector only during a movement of the deflected stimulation light beam over the storage phosphor layer in a second direction of movement opposite to the first direction of movement.

21. An apparatus for reading out X-ray information stored in a storage phosphor layer, the apparatus comprising:
a light source that generates a stimulation light beam which stimulates the storage phosphor layer to emit emission light;
a deflector that deflects the stimulation light beam to move the deflected stimulation light beam over the storage phosphor layer;
at least one sensor that detects a location of the deflected stimulation light beam and that generates an electrical signal corresponding to the detected location of the deflected stimulation light beam;
a driver that drives the deflector by delivering drive energy to the deflector;
a detector that detects the emission light emitted by the storage phosphor layer; and
a controller that:
controls the detector to detect the emission light only while the deflector moves in a first direction; and controls the driver to start delivering the drive energy to the deflector in response to and dependent upon the electrical signal corresponding to the detected location of the deflected stimulation light; wherein
the controller controls the driver to deliver the drive energy to the deflector only during a movement of the deflector in a second direction opposite to the first direction.

* * * * *